Nov. 29, 1932.   P. I. LEDOUX   1,889,097
PLOW
Filed May 16, 1928   2 Sheets-Sheet 1

INVENTOR
PHILIP I. LEDOUX
BY
ATTORNEY.

Nov. 29, 1932. P. I. LEDOUX 1,889,097
PLOW
Filed May 16, 1928 2 Sheets-Sheet 2

INVENTOR
PHILIP I. LEDOUX
BY
ATTORNEY.

Patented Nov. 29, 1932

1,889,097

UNITED STATES PATENT OFFICE

PHILIP I. LEDOUX, OF CLAREMONT, NEW HAMPSHIRE

PLOW

Application filed May 16, 1928. Serial No. 278,214.

My invention relates to plows.

It has for its object to provide an improved plow, and more particularly an improved plow of the reversible gang type and one adapted to be used in connection with a tractor in such manner as to enable the tractor to plow in either direction. A further object of my invention is to provide an improved arrangement of plows and supporting and adjusting means therefor, and more particularly, improved supporting and adjusting means especially adapted to use in connection with a tractor whereby the plow may be attached to and conveniently operated from the tractor and the plows adjusted for plowing in either direction or for transport. A still further object of my invention is to provide an improved construction of the character set forth which is simple and rugged in construction and adapted to be provided at small expense and to stand up well in service. These and other objects of my invention will, however, hereinafter more fully appear.

In the accompanying drawings I have shown, for purposes of illustration, one embodiment which my invention may assume in practice.

In these drawings,—

Figures 1, 5:
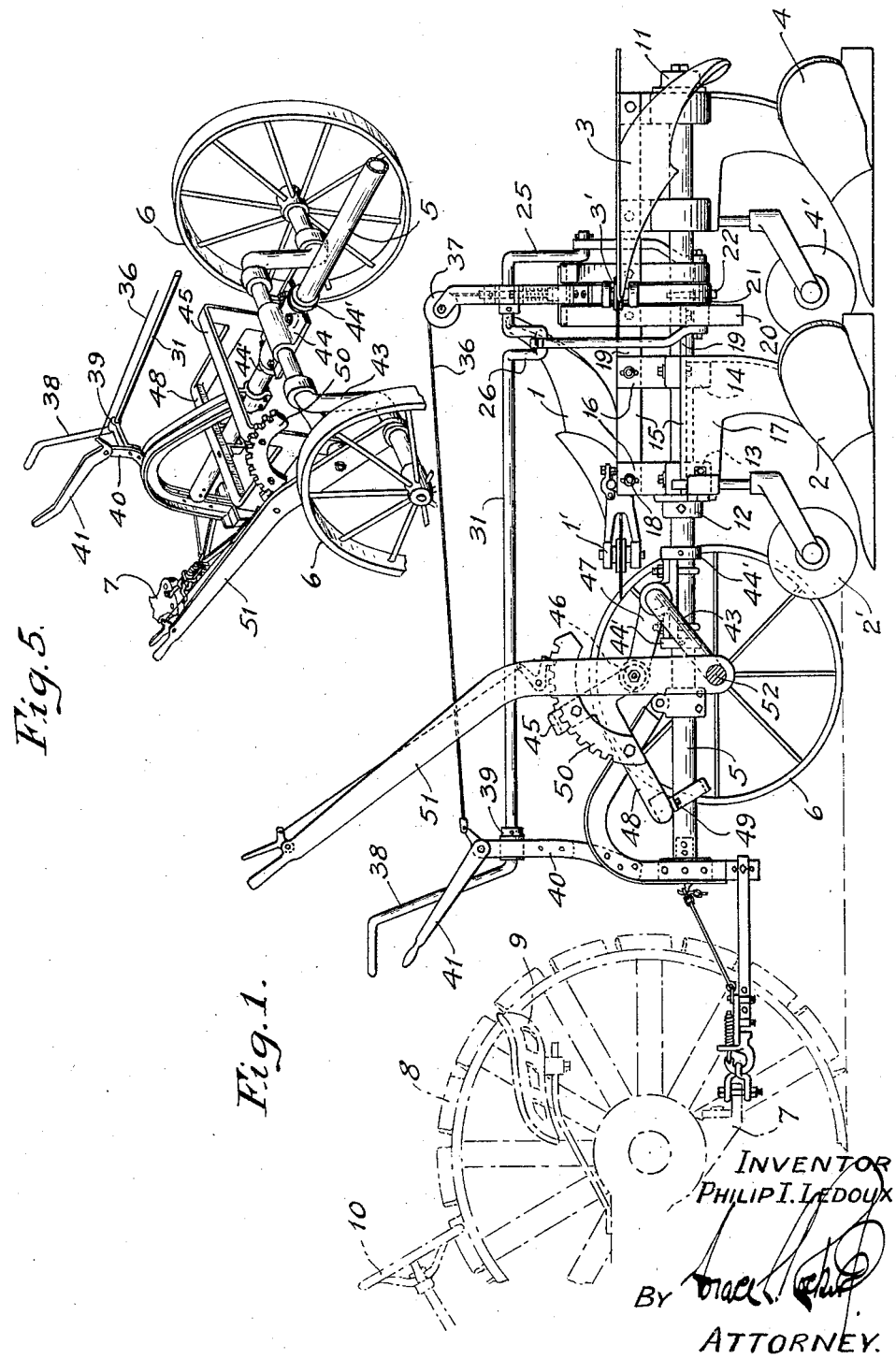
Figure 1 is a side elevation of this form of my improvement illustrated as connected to a tractor and in plowing position.
Fig. 5 is a perspective view of the fore-carriage, the same being shown in transport position.

In this illustrative construction, I have shown a plurality of plow gangs, one including plows 1, 2 and the other, plows 3, 4, and both supported on the rear end of a longitudinally extending support 5 which is in turn carried on a fore-carriage generally indicated at 6 and operatively connected by any suitable means to the draw-bar 7 of a tractor generally indicated at 8; the arrangement and construction being such that the plows 1, 2 and 3, 4 and the fore-carriage 6 may be adjusted by an operator seated on the seat 9 of the tractor adjacent the wheel 10, and adjusted in such manner as to utilize one plow in each gang when plowing in either direction.

More particularly considering the mechanism, it will be noted that the member 5 extends longitudinally backward from the connection to the tractor draw-bar and in rear of the fore-carriage, and that it herein assumes the form of a beam, preferably formed of heavy tubing or the like, and carries at its rear end the plow gangs 1, 2 and 3, 4. It will also be noted that these gangs are spaced longitudinally on the rear end of the beam 5 and that the same are of an improved construction, while operating mechanism therefor of an improved construction is also provided between the same on the beam 5 and the several parts are held in proper relationship longitudinally of the beam by a suitable end bearing 11 in rear of the gang 3, 4 and a co-operating collar 12 in front of the gang 1, 2.

Referring to the structure of the gangs, it will be noted that in this illustrative construction each gang is carried upon a frame of suitable construction adapted to be rotated upon the beam 5 and carrying two plows, one a righthand and the other a left-hand plow, disposed at right angles to one another. More particularly considering the frame construction, it will be noted that it herein comprises spaced journal members 13 and 14 rigidly connected longitudinally by members 15 attached to lateral extensions 16 on the members 13, 14. Moreover, it will be noted that the plow shank members 17 are rigidly connected beneath these members 15 to each of the extensions 16 in such manner as to produce an exceedingly rugged structure. Attention is also directed to the fact that provision is made for lateral adjustment of the plows to vary the width of the furrow, slot and bolt connections 18 being provided herein for this purpose, and that coulters 1', 2', 3', 4' of suitable form are also provided, herein also carried by the members 17.

Figure 4:
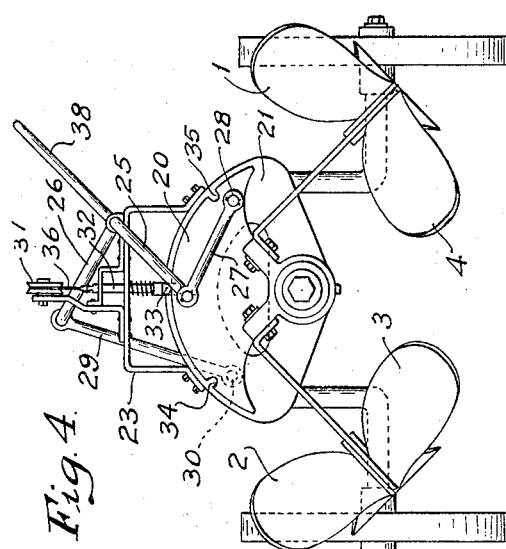
Fig. 4 is an end view showing the plows in transport position.

Associated with the gangs is also improved mechanism adapted to dispose the same in staggered relation during plowing. For example, the structure is such that when the two right-hand plows 1 and 3 are down in plowing position the two left-hand plows 2 and 4 are elevated and disposed in staggered balancing position, one on each side of the beam, while when the two left-hand plows are down in plowing position the two right-hand plows are up in staggered balancing position. Provision is also made whereby when desired, as during transport, the gang positions may coincide as shown in Fig. 4, wherein the two gangs while clearing the roadway are compactly disposed beneath the axis of the beam and in such position as to balance the mechanism.

In this embodiment the gangs have improved adjusting mechanism located between the same on the member 5. Herein one of the members 15 of each gang frame is extended as shown at 19 and fixed to an upright transversely swinging member 20 of generally sector shape and journaled at its bottom or axis on the beam 5. Moreover, it will be noted that between these members 20 a stationary frame 21 is provided on the beam 5, this frame herein being substantially semi-circular in shape and suitably fixed at its bottom, as by means 22, to the member 5. Upon this member 21 is also carried a secondary frame 23 providing a journal 24 for a plurality of cranks 25 and 26 disposed at right angles to one another and on opposite sides of the frame 23. As shown, one of these cranks 25 is pivotally connected to a link 27 pivoted at 28 at one end and on the rear surface of the rearmost member 20, while the crank 26 is pivotally connected to a link 29 longer than the link 27 and in turn pivotally connected at 30 to the opposite end of the front member 20 and on the front surface thereof. Thus, it will be observed that when the cranks 25 and 26 are rotated, as herein by the rotation of a rod 31, the members 20 may be swung transversely in opposite directions and in such manner as to swing the gangs reversely and bring either plows 2 and 4 or 1 and 3 into plowing position, while the inoperative plows are brought into their desired balancing positions above and on opposite sides of the beam 5.

Associated with this mechanism is also an improved holding mechanism. This herein includes a reciprocating spring pressed plunger 32 mounted in the frame 23 above the frame 21 and normally projected downward by its spring. In this construction, the plunger 32 has on its lower end a member 33 adapted to be received in cooperating notches in each of the rounded sector surfaces on the members 20. More particularly, it will be noted that notches 34 and 35 are disposed at opposite ends of the members 20 and that as the latter are swung in opposite directions by their cranks, the member 33 is adapted to engage in a notch 34 in one end of one member 20 and in the notch 35 in the opposite end of the other member 20. Thus, it will be noted that the plunger 32 is adapted to hold the members 20 and their connected gangs in the different positions of adjustment of the latter, and that after the plunger 32 has been released, as for example by pulling upon a flexible connection 36 passing over a pulley 37 on top of the frame 23 and operable from the tractor, the rod 31 may be rotated to swing the members 20 and their connected plow gangs.

Herein, both the means for actuating the rod 31 operating the cranks 25, 26 and means for actuating the flexible connection 36 connected to the plunger 32, are carried upon the front of the device and in a position readily accessible from the tractor; these means including a crank 38 disposed adjacent the operator's seat 9 on the tractor and journaled at 39 on a standard 40 supported by the fore-carriage, and also a vertically swinging lever 41, similarly disposed and supported, and connected to the connection 36.

More particularly considering the fore-carriage structure, it will be noted that the wheels of the fore-carriage 6 are carried on a pivoted axle member 42 having a U-shaped section 43 between its ends extending above the member 5 and pivotally attached to a clamp or bracket member 44 which is in turn carried on the member 5. Herein, a U-shaped frame 45 is also journaled at 46 and pivotally connected through links 47 to the U-shaped portion 43 of the axle, and a supplementary U-shaped frame 48 is connected to this frame 45 and pivotally and slidably connected at 49 to the member 5. Herein a notched sector 50 is also fixed to the frames 48 and 45, and an adjusting lever 51 is pivoted at 52 on the axle at its lower end and has these frames pivotally connected to it at 46 and is extended upwardly and forwardly toward the tractor so that the usual detent mechanism may be conveniently operated by an operator on the seat 9. Thus, movement of the lever 51 causes the axis of the wheels to move about the connection 44 as a pivot and thereby raise or lower the beam 5. It will also be noted that as it is desirable for the bracket 44 to be swiveled on the rod 5 to permit rocking of the fore-carriage relative to the latter and operation with one wheel in the furrow, collars 44' are provided to retain the bracket in the desired longitudinal position when its clamping means are positioned to permit this rocking movement.

Figure 3:
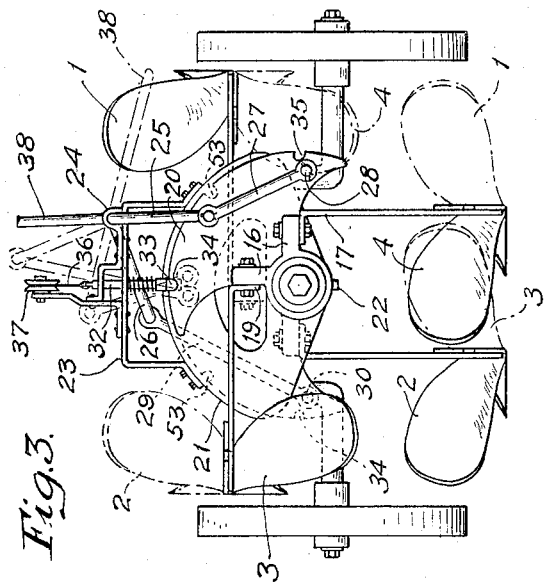
Fig. 3 is an end view showing the plows in their plowing positions, one set being shown in full lines and the plowing position of the other being indicated in dotted lines.
Figure 2:
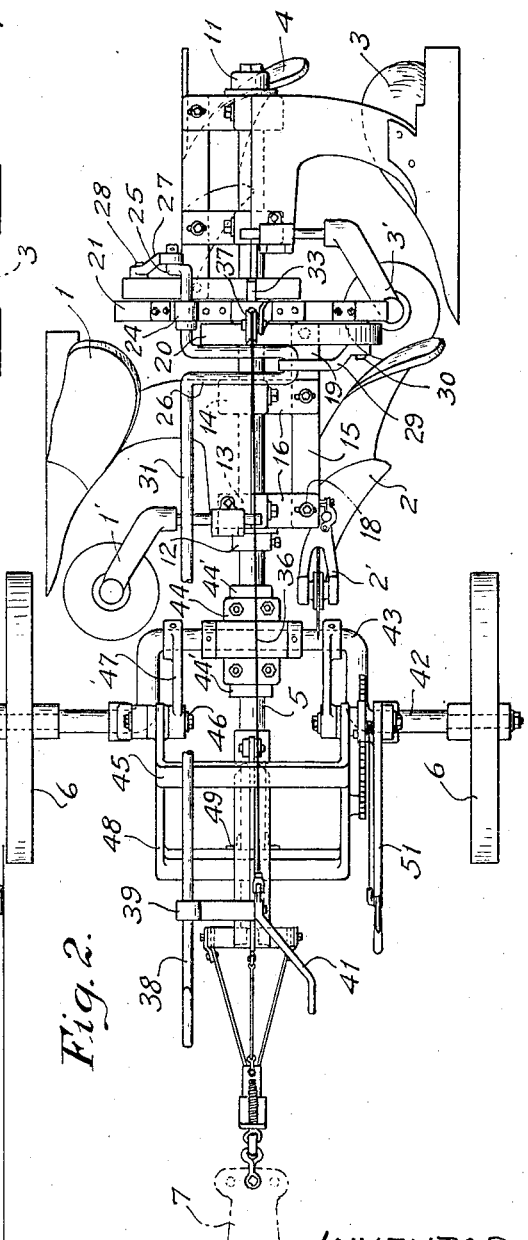
Fig. 2 is a plan view of the same.

In the use of my improved construction, it will be evident that when the parts are in the plowing position shown in Figs. 1, 2 and 3, the plows 2 and 4 are operative to throw two furrows in the same direction. When the end of the piece is reached, the tractor is turned around, and then, after the plows 2 and 4 have been swung up and the plows 1 and 3 simultaneously swung down, returns along the piece in the opposite direction, the plows 1 and 3 then throwing the next two furrows in the same direction as before. More particularly, when it is desired to change the plows, it is only necessary to release the plunger 32 through operation of the lever 41 and then, through operation of the crank 38, swing the plows 2 and 4 out of operative position and the plows 1 and 3 into operative position, the spring pressed plunger 32 automatically acting to hold the same in their new position. Attention is also directed to the fact that when it is desired to move the plow from place to place, it is only necessary to operate the crank 38 to swing the plows into the intermediate position shown in Fig. 4, in which all the plows clear the ground and are disposed in such balanced relation as to be readily maintained in that relation by the action of the spring pressed plunger 32. If desired, however, suitable intermediate notches 53 may be provided in the members 20 to cooperate with the plunger in this position, these, like the notches 34 and 35, also being automatically engaged by the plunger 32 as the parts are swung.

As a result of my improvement, it will be noted that the plows are effectually balanced, either during adjustment, plowing, or transport. Attention is also directed to the fact that a center draft is obtained and that whether the right hand or the left hand set of plows is in use, the plows of the set in use are equally spaced from the line of draft on opposite sides of the same with one plow in front of the other, while the unused plow in each gang is disposed in balancing position, as illustrated in Fig. 3. It will also be evident that the mechanism is exceedingly simple and rugged and of a type adapted to be readily adjusted and cheaply manufactured and to use in connection with more than two plows if desired. Attention is also directed to the fact that in my improved construction all necessity for any rear support or rear supporting wheel is eliminated in such manner as not only to simplify and cheapen the structure, but to facilitate control of the same and enable a much more compact construction longitudinally to be produced and one which requires only a forecarriage and has the plows compactly disposed in rear of the same and also readily changeable from their lowered trailing relation during plowing to their elevated position during transport by simply adjusting the forecarriage mechanism. Attention is also directed to the fact that at the same time that the above advantages are obtained, it is made possible to utilize rigidly connected plows in gangs, as distinguished from single plows, and gangs of a simple and rugged character having simple and rugged operating means and further to use coaxial gangs requiring a minimum of bearing and operating means, as compared with those constructions utilizing a plurality of sets of separate plows or a plurality of laterally offset longitudinal axes. It will also be noted that my improved arrangement of the gangs is such that while these advantages are obtained, it is also possible to produce an effectively balanced construction wherein the plows in either set during plowing are disposed on opposite sides of the line of draft in a most effective manner. These and other advantages of my improved construction will, however, be clearly apparent to those skilled in the art.

While I have this application specifically described one embodiment which my invention may assume in practice, it will be understood that the same is shown for purposes of illustration only, and that the invention may be modified and embodied in various other structures without departing from its spirit or the scope of the appended claims.

What I claim as new and desire to secure by Letters Patent is:—

1. In a plow, a draft frame connectible to the rear end of a tractor, and a plurality of combined right and left plow gangs thereon each comprising right and left hand plows at right angles to one another and said gangs being one rotatable bodily relative to the other in a plane parallel thereto to bring corresponding plows into simultaneous plowing positions one on each side of the line of draft.

2. In a plow, a frame, a plurality of plow gangs, each comprising rigidly connected right and left hand plows, said gangs being pivoted on said frame for movement in transverse planes and movable transversely one relative to the other, and means for so moving both gangs.

3. In a plow, a frame, a plurality of plow gangs, each comprising rigidly connected right and left hand plows, said gangs being pivoted on said frame coaxially for movement in transverse planes and movable transversely one relative to the other, and means between said gangs for moving both gangs.

4. In a plow, a frame, a plurality of plow gangs each including rigidly connected right and left hand plows, said gangs being pivoted on said frame for movement in transverse planes and movable transversely one relative to the other, and means for simultaneously moving both gangs.

5. In a plow, a frame, and a plurality of plow gangs each including a plurality of rigidly connected plows disposed at right angles, said gangs being pivoted on said frame for movement in transverse planes and movable transversely one relative to the other.

6. In a plow, a frame, and a plurality of plow gangs each including rigidly connected right and left hand plows disposed at right angles, said gangs being pivoted on said frame for movement in transverse planes and movable transversely one relative to the other.

7. In a plow, a frame, a plurality of coaxial transversely swinging plow gangs thereon each including a right-hand and a rigidly connected left-hand plow disposed at right angles thereto, and means for simultaneously swinging said gangs.

8. In a plow, a frame, a plurality of plow gangs, each comprising rigidly connected right and left hand plows, said gangs being pivoted on said frame coaxially for movement in transverse planes and movable transversely one relative to the other, and means for swinging said gangs in opposite directions.

9. In a plow, a frame, a plurality of plow gangs, each comprising rigidly connected right and left hand plows, said gangs being pivoted on said frame coaxially for movement in transverse planes and movable transversely one relative to the other, and means for swinging said gangs simultaneously in opposite directions.

10. In a plow, a frame, a plurality of plow gangs, each comprising rigidly connected right and left hand plows, said gangs being pivoted on said frame for movement in transverse planes and movable transversely one relative to the other, and means disposed between said gangs for swinging said gangs transversely.

11. In a plow, a frame, a plurality of plow gangs, each comprising rigidly connected right and left hand plows, said gangs being pivoted on said frame coaxially for movement in transverse planes and movable transversely one relative to the other, means for swinging said gangs in opposite directions into different positions, and means for holding the same in said different positions of adjustment.

12. In a plow, a frame, a plurality of plow gangs each including a plurality of rigidly connected plows disposed at right angles, said gangs being pivoted on said frame coaxially for movement in transverse planes and movable transversely one relative to the other, and means for swinging said gangs in opposite directions.

13. In a plow, a frame, a plurality of coaxial transversely swinging plow gangs on said frame having their plows rigidly connected disposed in staggered relation, each gang including a right-hand and a left-hand plow disposed at right angles to one another, and means for swinging said gangs in transverse planes one relative to the other.

14. In combination, a frame having a forecarriage, a plurality of transversely movable plow gangs, each comprising rigidly connected right and left hand plows, said gangs being in rear of said forecarriage and connected thereto and also being movable one relative to the other in transverse planes, and means operable from in front of the forecarriage for moving said gangs transversely one relative to the other.

15. In combination, a frame having a forecarriage, a plurality of coaxial transversely movable plow gangs, each comprising rigidly connected right and left hand plows, said gangs being in rear of said forecarriage and connected thereto and also being movable one relative to the other in transverse planes, and means for moving said gangs transversely one relative to the other including gang swinging mechanism between said gangs and operable from the front of said forecarriage.

16. In a plow, a wheeled draft frame connectible to the rear end of a tractor and adjustable relative to its wheels, a plurality of combined right and left plow carrying gangs each having a plow in rear of said wheels during plowing, said gangs being bodily rotatable relative to one another in parallel planes about a common axis on said frame to bring either set of corresponding plows into simultaneous plowing positions one on each side of the line of draft, and means operable from in front of said frame for adjusting the latter and rotating said gangs.

17. In combination, an adjustable forecarriage presenting a rearwardly projecting longitudinal beam, a plurality of plow gangs journaled on the rear end of said beam and movable transversely one relative to the other, each comprising rigidly connected right and left hand plows, and means operable from in front of said fore-carriage for swinging said gangs and adjusting said forecarriage.

18. In a plow, a wheeled draft frame connectible to the rear end of a tractor and having a gang carrying member thereon, a plurality of combined right and left plow carrying gangs carried by said member in rear of the frame wheels during plowing and bodily adjustable relative to one another about the axis of said member to bring either set of corresponding plows into simultaneous plowing position one on each side of the line of draft, means for vertically adjusting said frame relative to its wheels into and out of plowing position, and means for swinging said gangs, both of said means being controllable from the front of said draft frame.

19. In a plow, a wheeled draft frame connectible to the rear end of a tractor and having a longitudinal beam projecting rearwardly therefrom, and a plurality of combined right and left plow gangs carried by said beam adjustable about axes coaxial with said beam and one movable relative to the other.

20. In a plow, a wheeled draft frame connectible to the rear end of a tractor and having a longitudinal beam projecting rearwardly therefrom, a plurality of plow gangs carried by said beam independently movable on axes coaxial with said beam and disposed one in front of the other on said beam and each including a right hand plow and a left hand plow, and means adjustable from the front end of said draft frame for simultaneously swinging said gangs about their axes.

21. In a plow, a wheeled draft frame connectible to the rear end of a tractor and having a longitudinal beam projecting rearwardly therefrom, a plurality of plow gangs carried by said beam independently movable on axes coaxial with said beam and disposed one in front of the other on said beam and each including a right hand plow and a left hand plow spaced from one another substantially 90° around the axis of said beam, and means adjustable from the front end of said draft frame for simultaneously swinging said gangs about their axes.

22. In a plow, a frame including a longitudinal beam, a plurality of plow gangs movable transversely relative thereto and to one another, a sector member movable with each gang, and operating mechanism connected to said sector members.

23. In a plow, a frame including a longitudinal beam, a plurality of plow gangs movable transversely relative thereto and to one another, a sector member movable with each gang, and operating mechanism connected to said sector members including a plurality of cranks connected to opposite ends of said sector members.

24. In a plow, a frame including a longitudinal beam, a plurality of plow gangs movable transversely relative thereto and to one another, a sector member movable with each gang, and operating and holding mechanism cooperating with each sector member.

25. In a plow, a frame including a longitudinal beam, a plurality of plow gangs movable transversely relative thereto and to one another, a sector member movable with each gang, and operating and holding mechanism cooperating with each sector member and including crank and plunger mechanism carried on said frame.

26. In a plow, a frame presenting a rearwardly projecting longitudinal beam, coaxial plow gangs on the rear end of said beam longitudinally spaced from one another and each including a right-hand and a left-hand plow disposed at right angles to one another, the plows in each gang being staggered relative to those in the other, means for swinging said gangs transversely one relative to the other, and holding means holding said gangs against transverse swinging during plowing.

27. In a plow, a draft frame connectible to the rear end of a tractor and adjustable from the front end of said frame, a plurality of plow gangs thereon, each having rigidly connected right and left hand plows, said gangs being rotatable relative to one another on said frame in parallel planes to bring corresponding plows into simultaneous plowing position one on each side of the line of draft, and means constantly out of engagement with the ground and operable from in front of said draft frame for reversing said gangs.

28. In a plow, a draft frame connectible to the rear end of a tractor, a plurality of plow gangs thereon each having rigidly connected right and left hand plows, said gangs being rotatable relative to one another about a common axis and in parallel planes to bring corresponding plows of different gangs into simultaneous plowing position, one on each side of the line of draft, and mechanism constantly out of engagement with the ground for reversing said gangs relative to said axis and carried on said frame and having controlling means operative from in front of the latter.

29. In a plow, a draft frame connectible to the rear end of a tractor and having supporting wheel means, a plurality of plow gangs on said frame in rear of said wheel means, each including unitarily connected right and left hand plows, and simultaneously rotatable relative to one another in parallel planes to bring corresponding plows into simultaneous plowing position on opposite sides of the line of draft, and a plurality of means constantly out of engagement with the ground and operable from in front of said frame for reversing said gangs and adjusting said frame relative to the wheel means thereof.

30. In a plow, a wheeled draft frame vertically adjustable relative to its wheels into and out of plowing position and connectible to the rear end of a tractor, a plurality of plow gangs thereon in rear of said wheels, each including a right and a rigidly connected left hand plow, and simultaneously rotatable relative to one another about a common axis and in parallel planes to bring corresponding plows into simultaneous plowing positions one on each side of the line of draft and equally spaced therefrom, and a plurality of means constantly out of engagement with the ground for raising said frame, reversing said gangs, and lowering said frame, said means being controllable from in front of the draft frame.

31. In a plow, a draft frame connectible to the rear end of a tractor and having adjustable swinging front wheel carrying means and a gang journal vertically adjustable with said frame by said swinging wheel carrying means, a plurality of plow gangs each having rigidly connected right and left hand plows, said gangs being adjustable relative to one another about the axis of said journal to bring plows in different gangs into trailing position in rear of said draft frame on opposite sides of the line of draft when plowing in either direction, and means constantly out of engagement with the ground and operable from in front of said draft frame for swinging said gangs about the axis of said journal.

32. In a plow, a draft frame connectible to the rear end of a tractor having front swinging wheel carrying members adjustable to vary the height of said frame and a gang supporting member vertically adjustable with said wheel carrying members, and a plurality of combined right and left plow gangs on said supporting member and adjustable relative to one another about the axis thereof to bring corresponding plows in each gang into simultaneous plowing position, one on each side of the line of draft.

33. In a plow, a draft frame connectible to the rear end of a tractor having draft connections and front swinging wheel carrying members adjustable to vary the height of said frame and also having gang supporting means between said members receiving the draft from said draft connections and vertically adjustable with said wheel carrying members, and a plurality of combined right and left plow gangs on said supporting means and adjustable relative to one another about a common axis to bring corresponding plows in each gang into simultaneous plowing position, one on each side of the line of draft.

34. In a plow, a draft frame connectible to the rear end of a tractor having draft connections and front swinging wheel carrying members and also having gang supporting means between said members receiving the draft from said connections and vertically adjustable as said members are swung, a plurality of combined right and left plow gangs carried by said means and movable relative to one another about a common axis, means for swinging said members, and means for swinging said gangs relative to one another to bring either set of corresponding plows into plowing position, one on each side of the line of draft.

35. In a plow, a draft frame having adjustable swinging wheel carrying means only on its front end, a plow beam connected to said frame supported wholly by its plows and said frame and extending longitudinally of the latter in rear of the wheels on said frame, mechanism operatively connecting said beam and said wheel carrying means having the latter swivelled for movement about the longitudinal axis of said beam, and plows carried by the portion of said beam in rear of said swinging wheel carrying means.

36. In a plow, a draft frame having adjustable swinging wheel carrying means only on its front end, a plow beam connected to said frame supported wholly by its plows and said frame having its front end extending under the axis of said swinging means and its rear end extending longitudinally of said frame in rear of the wheels on the latter, mechanism operatively connecting said beam and said wheel carrying means having the latter swivelled for movement about the longitudinal axis of said beam, and plows carried by the portion of said beam in rear of said swinging wheel carrying means.

37. In a plow, a draft frame having adjustable swinging wheel carrying means, a plow beam connected to said draft frame and extending longitudinally thereof, means between said beam and said wheel carrying means forming swivel means on which the latter is swivelled for movement about the longitudinal axis of said beam, adjusting means for said beam and said wheel carrying means pivotally and slidably connected to said beam in front of said swivel means and operatively connected pivotally to said swinging wheel carrying means in front of said swivel means, and co-operating adjusting means operatively connected to the wheel axis and to said last mentioned pivotal connection.

38. In a plow, a draft frame having adjustable swinging wheel carrying means, a plow beam connected to said draft frame and extending longitudinally thereof, operative connections for said wheel carrying means swivelled to permit wheel movement about the longitudinal axis of said beam and operative from the front of said draft frame, a plurality of relatively adjustable plow gangs carried by said beam in rear of said swivel, and operative connections for the plow gangs operative to swing one relative to the other and operable from the front of said draft frame.

In testimony whereof I affix my signature.

PHILIP I. LEDOUX.